July 30, 1940.   A. W. KNIGHT   2,209,339
VARIABLE FLOW DUST COLLECTOR
Filed July 6, 1937   3 Sheets-Sheet 3
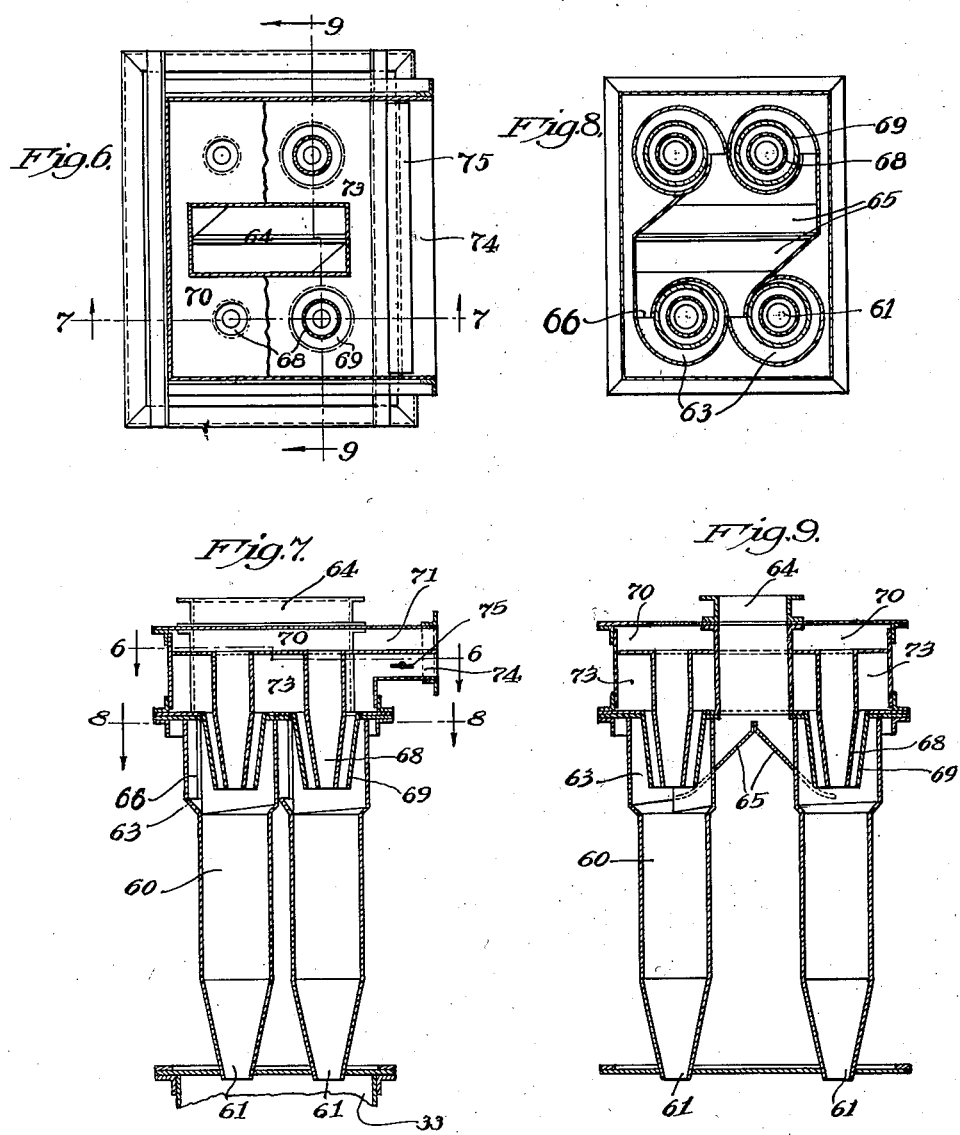
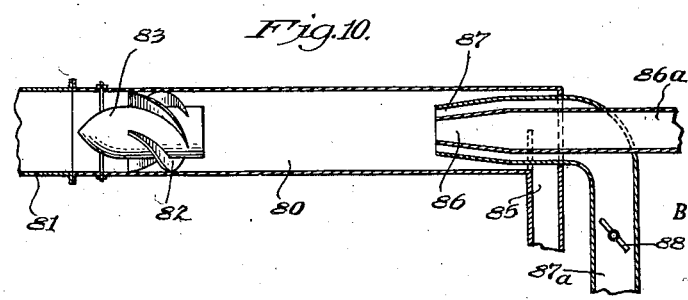
Alfred W. Knight
INVENTOR.

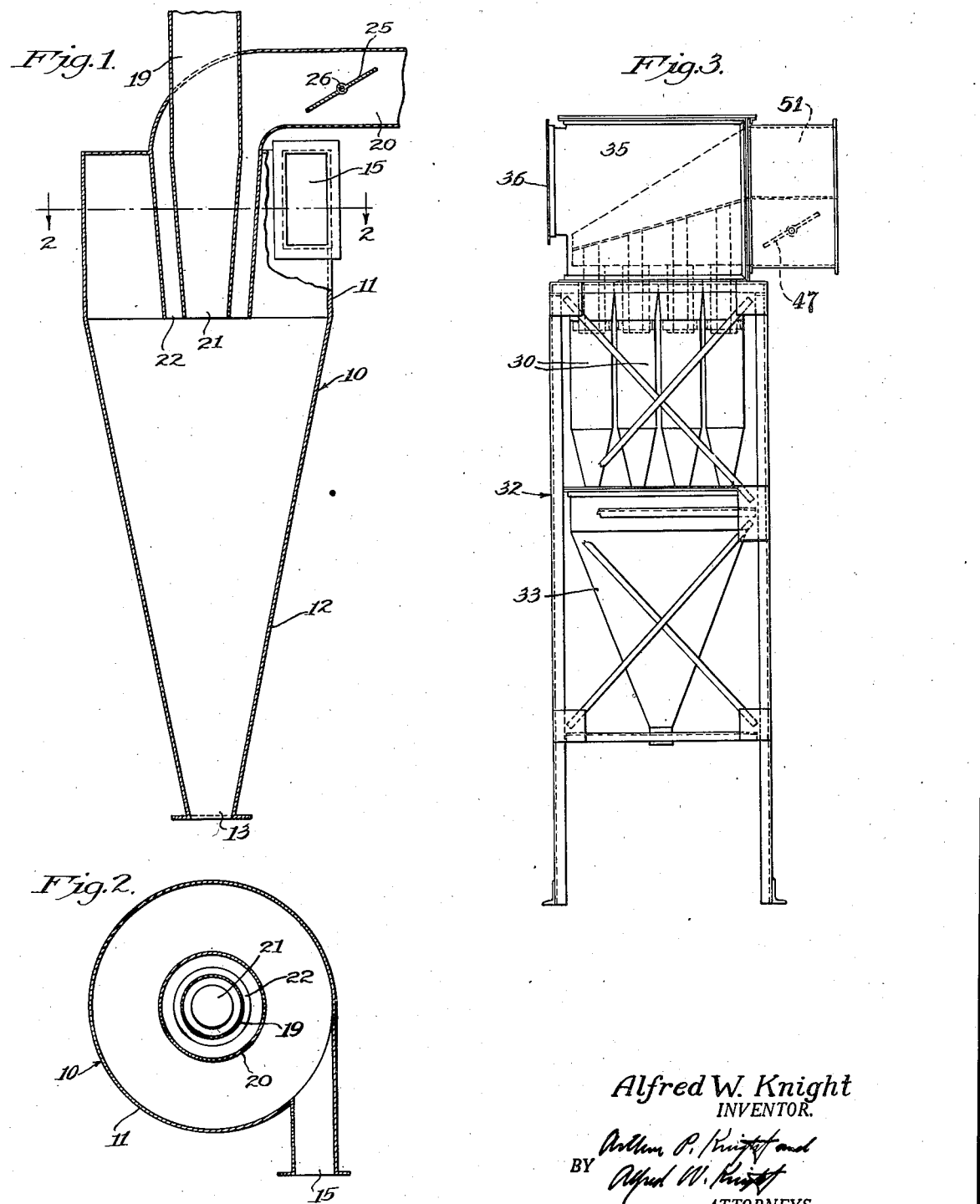

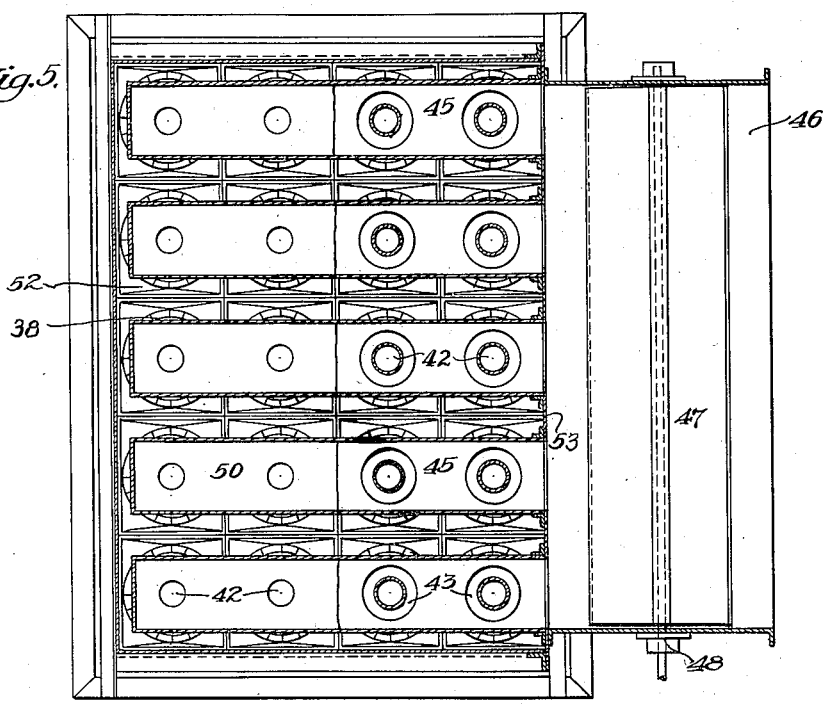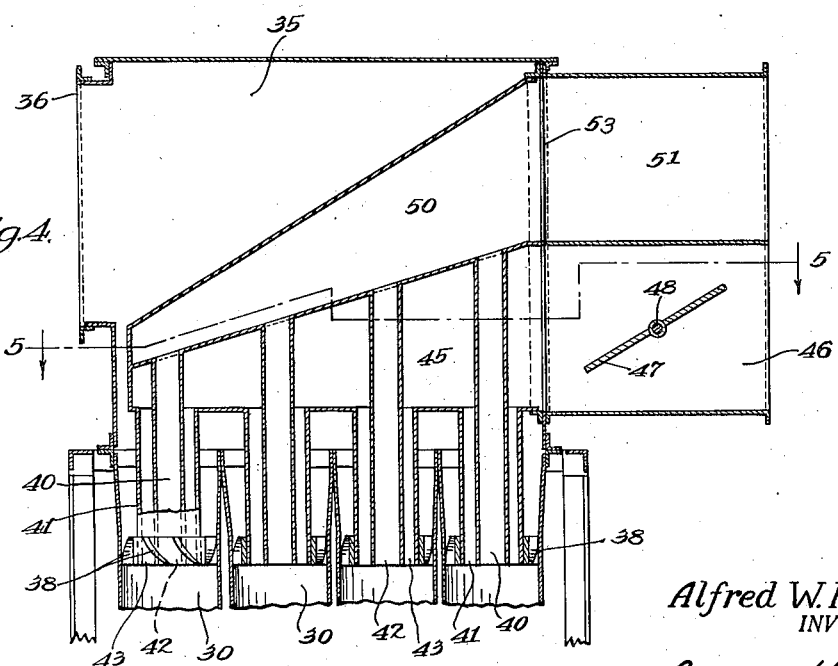

Patented July 30, 1940

2,209,339

UNITED STATES PATENT OFFICE 2,209,339

VARIABLE FLOW DUST COLLECTOR

Alfred W. Knight, South Pasadena, Calif., assignor to International Precipitation Company, Los Angeles, Calif., a corporation of California Application July 6, 1937, Serial No. 152,214

7 Claims. (Cl. 183—34)

The present invention relates generally to dust collectors of the centrifugal type commonly known as "cyclone separators," wherein a stream of gas laden with finely divided foreign material, either liquid or solid, is subjected to a whirling motion that separates and collects the foreign particles, and is more particularly concerned with means for controlling gas flow through one or more separators to accommodate the collector to varying volumes of gas.

Centrifugal separators of this type are designed to operate at a maximum or desired efficiency when handling a predetermined volume of gas per unit time, because the efficiency of the collector is largely dependent on the velocity of flow through the unit and the pressure drop between inlet and outlet. Collectors are usually designed for the maximum normal flow in order to secure best efficiency of separation and will handle larger volumes satisfactorily, but when the rate of flow drops materially below the rated capacity of the unit there is a marked decrease in efficiency.

Experiments have shown that by constricting the inlet opening in proportion to the reduced rate of flow, the entrance velocity is maintained; but this has been found only partially effective in preventing a reduction in collection efficiency at the lower rate of gas flow, probably because the velocity of whirling motion of the gas in the cyclone separating chamber is still too low to provide effective separation of the suspended dust particles by centrifugal action. However, by constricting the outlet opening in proportion to the decrease in flow by decreasing the diameter of the opening, the operating head is maintained at a suitable value to effect efficient dust separation.

Any mechanical means for providing a variable size outlet orifice is necessarily somewhat complicated, which means that manufacturing costs are raised above practical commercial limits and prohibit the use of such a device. Orifice restricting mechanism is bulky and so fills the small space at the end of the collector that the resulting obstruction to gas flow causes excessive draft losses and decreases the efficiency of separation. These disadvantages are especially emphasized in dust collectors of the multiple tube type because all the outlets from the individual units must be controlled in unison, requiring additional mechanism for this purpose.

Hence it becomes a general object of my invention to provide means for adapting a centrifugal dust collector, of either the single cyclone type or the multiple-tube type, to a variable rate of gas flow without loss of efficiency of separation.

It is also an object to provide means for regulating the exhaust from a dust collector so that operating conditions in the collector may be maintained at efficient values in spite of variation in the volume of gas passed per unit time.

Another object is to provide flow control means for a dust collector that is simple and cheap to manufacture and will not adversely affect operating conditions within the collector by causing eddy currents or other losses.

It is also an object of my invention to make a flow regulator that is equally adaptable to apparatus provided with one or more cyclone separating units.

These objects have been attained in apparatus constructed according to my invention by combining with a centrifugal dust separator having the usual gas inlet and dust outlet means, gas outlet means providing a pair of gas outlet passages having concentric orifices that open into the separator, preferably at substantially the same plane. In one of these gas outlet passages, and preferably the passage having an orifice of larger diameter, is placed adjustable means for restricting gas flow through the passage, such means preferably taking the form of a damper adjustably mounted in the passage. Where the gas cleaning apparatus comprises a number of separator units, each individual unit is provided with a pair of outlet members, and corresponding members of all the units preferably communicate with a common header to combine them into a larger duct, and it is in this larger duct that the adjustable flow restricting means is preferably placed so that a single means controls the exhaust flow from a number of individual separating units. However, it will be understood that, if desired, separate means may be provided for adjustably restricting the flow of gas through one of the outlet members of each unit.

How the above and additional objects and advantages of my invention are secured, will be better understood from reference to the following description and the annexed drawings in which:

Fig. 1 is a vertical median section of a single typical centrifugal dust separator with a pair of concentric gas outlet ducts, with a portion of the housing and the gas inlet duct shown in elevation;

Fig. 2 is a horizontal section on line 2—2 of Fig. 1;

Fig. 3 is an elevation of gas cleaning apparatus comprising a plurality of individual dust separating units of which the outlets are connected to common outlet headers;

Fig. 4 is an enlarged fragmentary vertical section of the upper portion of Fig. 3;

Fig. 5 is a horizontal section on line 5—5 of Fig. 4;

Fig. 6 is a horizontal section taken on line 6—6 of Fig. 7 of gas cleaning apparatus comprising a plurality of individual dust separating units of a variational form;

Fig. 7 is a vertical section on line 7—7 of Fig. 6;

Fig. 8 is a horizontal section on line 8—8 of Fig. 7;

Fig. 9 is a vertical section on line 9—9 of Fig. 6; and

Fig. 10 is a vertical section of a horizontal, through-flow type of separator.

Figs. 1 and 2 illustrate a conventional type of centrifugal dust collector comprising a single cyclone separator having outer shell 10 of circular cross-section. The upper portion 11 of the shell is cylindrical, while the lower portion 12 is conical and tapers downwardly to form dust outlet 13 at the lower end of the housing. The upper portion 11 of the housing is provided with an inlet 15 through which enters a stream of gas carrying the foreign particles which are to be separated, the inlet being so positioned that the stream of gas enters tangentially of the housing.

The gas outlet means comprises a pair of outlet passages or ducts 19 and 20, circular in cross section, extending downwardly from the top of housing 10, one within and concentrically of the other, both ducts being arranged coaxially of housing 10. Both ducts 19 and 20 preferably extend below the top of the housing for substantially the same distance so that where they terminate in circular orifices 21 and 22 they open to the separator interior at substantially the same plane. Since the ducts are placed one inside the other, orifices 21 and 22 are of different diameters and the net opening of the larger diameter orifice 22 is in the shape of an annulus surrounding the smaller diameter orifice 21. The flow control means mounted in passage 20 comprises plate-like damper 25 pivotally mounted at 26 on the walls thereof and operated by any suitable means, not shown, which may be either manual or mechanical, and in the latter instance may be connected with automatic control apparatus responsive to changes in flow conditions through the collector or elsewhere in the system to which the collector is connected.

In operation, the stream of dust laden air enters through inlet 15 and is given a whirling motion that moves it downwardly within the collector in a spiral path. Under the influence of centrifugal force the heavier particles of dust are thrown outwardly to the walls of the housing and are carried downwardly by the stream of gas so that they are discharged through dust outlet 13, which may empty into any hopper, bin, conveyor or similar means for holding or removing the collected dust. As the gas whirls downwardly toward the bottom of the collector, the cleaned gas gradually moves inwardly toward the axis of the collector and then reverses its direction of flow and moves upwardly, while still whirling, to enter orifices 21 and 22 and is finally carried out through outlet ducts or passages 19 and 20. For a maximum volume of gas, damper 25 is placed in the full open or horizontal position, in which case orifices 21 and 22 are in effect a single outlet opening having the same diameter as the outer orifice and offer a minimum resistance to gas flowing out of the separator. When the gas flow is at a minimum, the separator is operated with damper 25 fully closed in a vertical position, and in this case the effective outlet for the gas is only orifice 21 because flow through orifice 22 has then completely stopped.

When damper 25 is completely closed, gas exhausts from the separator only through inner orifice 21 with the result that the gas must travel a greater distance inwardly from the walls of housing 10 before it reaches the gas outlet, and the reduced radius of the inner gas vortex moving toward the outlet opening produces a higher velocity in this vortex and a greater centrifugal separating action on the particles. Also, when flow through duct 20 has been shut off, the pressure required to exhaust a given volume of gas is increased. The combination of these factors keeps the gas velocity and pressure at such values as bring about effective separation of foreign material from the gas at the reduced rate of gas flow. For intermediate rates of gas flow, intermediate positions of damper 25, that is when the damper is partially closed, as shown in Fig. 1, restrict the flow of gas through duct 20 but without any restriction upon gas flow through the inner outlet duct 19, and the effectiveness of these intermediate positions is approximately in proportion to the amount of restriction imposed upon gas flow by the damper. With the damper wide open the outgoing gas is distributed more or less evenly between passages 19 and 20; and as the damper is closed the rate of flow through inlet 15 decreases, the progressive restriction in duct 20 causes a progressively increasing proportion of the flow to leave by the smaller orifice 21 and passage 19, until finally when the damper is fully closed, all the outgoing gas has been concentrated in the one outlet duct 19. The effect upon flow conditions at the combined outlet orifices 21 and 22 imposed by closing damper 25 is very closely similar to the effect accomplished by actually reducing the diameter of the outlet orifice, and consequently the area through which gas can leave the separator, in contrast to the result which might be expected from such a damper of merely making flow through an orifice of a given size more difficult. This latter would be the result produced by providing only a single outlet duct furnished with a damper such as described.

Experiments show that if the draft loss, i. e. the pressure drop across the collector between gas inlet and gas outlet, is maintained at a constant value by closing damper 25 as the volume of gas furnished per unit time is decreased, that the efficiency of separation as measured by the percentage removal of suspended matter is maintained constant or even increased to a slight but definite extent. These experiments indicate that in addition to maintaining a substantially constant draft loss and operating efficiency as the rate of flow through the separator is reduced, the damper 25 can also be used to raise the operating efficiency for a constant supply of gas provided that an increase in draft loss is permissible.

It will be understood that the gas stream passing through the two outlet ducts 19 and 20 may be separately discharged to the atmosphere or separately delivered to other apparatus, or that these two gas streams may be recombined by connecting the two ducts to a common flue.

Figs. 3, 4 and 5 illustrate a preferred application of my invention to a multiple-tube form of dust collector comprising a plurality of individual units and in which each unit operates in a manner somewhat similar to that described in connection with Fig. 1. The form of gas cleaning apparatus illustrated in these figures, and the general mode of operation thereof, are described in greater detail in Lissman U. S. Patent No. 1,909,- 184, granted May 16, 1933. The collector comprises a plurality of individual dust separating units 30 of generally circular cross section and small diameter supported on a frame work generally indicated at 32 and arranged so that their lower ends empty the dust into a common hopper 33 likewise supported on frame structure 32. As may be seen better in Figs. 4 and 5, separators 30 are grouped in a rectangular formation and may be considered as arranged in a plurality of rows extending from left to right as viewed in these figures. A common inlet header 35 is provided for all of the separating units. Header 35 is formed with a laterally facing rectangular opening 36 which connects with a flue or other source of gas and deflects the incoming gas stream downwardly so that it enters the top ends of the separators in a vertical direction as contrasted with the horizontal direction of entry in the collector of Fig. 1. It will be noticed from Fig. 5 that the upper ends of separators 30 are flared out into rectangular form so that the units fit tightly together and the gas enters the square upper end of each unit. Inclined vanes 38 are placed at the top of the circular cross-sectional portion of each separator and the incoming stream of gas has a whirling motion imparted to it by contact with these vanes.

As before, the gas outlet means at the top of each separator 30 comprises an inner member 40 and an outer member 41 arranged concentrically of each other and coaxially of the separator. These outlet members are circular in cross-section and of different diameters so that they present concentric outlet orifices 42 and 43 opening into the separator at substantially the same plane.

All the outer outlet members 41 from a single row of separators 30 extend upwardly and communicate with a common header 45. From Fig. 5 it will be seen that the several headers 45, there being one for each row of collectors, connect with a common outlet duct 46 through opening in the back wall 53 of the inlet header 35. In duct 46 is placed a rectangular plate-like damper 47 pivotally mounted at 48 on the walls of the duct. By rotating damper 47 about its pivotal supports, gas flow through duct 46 is restricted and flow conditions simultaneously regulated in all of collectors 30. In the same way, all of the inner outlet members 40 of a row of collectors extend upwardly through the header 45 of that row and open into a common header 50, while the several headers 50, there being one for each row of collectors, are formed as extensions of and empty into a second outlet duct 51.

In the construction shown, headers 50 are superimposed on headers 45, all these outlet headers being enclosed within the single common inlet header 35. In order to permit incoming gas to reach the upper ends of the separators, the outlet headers for each row are spaced from the headers for the adjoining row of separators, as at 52. There is thus ample room for the incoming gas to flow downwardly around the outlet header and into the separators. However, outlet ducts 51 and 46 from beyond back wall 53 of header 35 extend continuously across the entire width of the apparatus between the end rows of separators. With the construction shown, damper 47 is in effect an adjustable means for restricting the flow in one of the outlet ducts provided for each of the dust separators, the progressive restriction of flow operating to progressively concentrate, or increase the proportion of the discharged gas exhausted through passage 50, 51. If desired, the draft loss across the collector as a whole may be maintained substantially constant, as previously described, by adjusting damper 47. Since all corresponding outlet members 41 from the individual separators are joined together in a common outlet duct 46, the single restricting means operates equally and simultaneously to regulate flow in all the separators. With this construction, the pair of gas outlet passages are formed one, by members 40, 50, 51 and the other, by members 41, 45, 46.

This demonstrates the ease with which my invention may be applied to one or to a number of dust separators, without departing from the fundamental principles of control utilized in a single separator.

Another variational form of construction is illustrated by the gas cleaning apparatus of Figs. 6 to 9, which comprises a plurality of dust separating units 60. This general type of apparatus is described in considerable detail in U. S. Patents Nos. 1,930,806 and 1,990,943, granted October 17, 1933 and Feb. 12, 1935, to Horne and Lissman, and to which reference may be made for additional details of construction and operation.

In this form of apparatus each separator 60 is formed with a lower conical section having a dust outlet 61, a central cylindrical section, and an upper inlet section 63 in the shape of an involute curve. Gas enters the apparatus vertically through rectangular inlet conduit 64 and the entering stream is divided in two portions by the inclined plates 65, each portion of the gas being deflected to a pair of separators 60 as shown in Figs. 8 and 9. Gas enters the separating unit proper through opening 66 of the involute section 63 and is given a downwardly inclined spiral motion within the separator.

The gas outlet means comprises an inner conical member 68 and an outer conical member 69, these two members being concentric and arranged coaxially of the dust collector. As before described, the two outlet members terminate in orifices that open into a separator at substantially the same plane. Inner outlet members 68 from a pair of dust collectors 60 connect with a common outlet header 70, and the two headers 70 communicate with outlet conduit 71, the members 68, 70, and 71 thus forming one of the gas outlet passages. In the same way the outer outlet members 69 communicate with a common header 73, the two headers 73 opening into outlet duct 74, to provide the other gas outlet passage. Damper 75 of rectangular form is pivotally mounted within duct 74 so that by rotation of the damper gas flow through the duct may be suitably restricted. Outlet members 68 for one pair of units 60 extend upwardly through header 73 to reach header 70 that is directly above header 73. As seen in Fig. 9, a pair of headers 70, 73 is disposed at each side of the vertical inlet 64, the outlet headers extending horizontally beyond inlet 64 to join the common ducts 71 and 74.

The mode of operation of the several separators 60 is the same as previously described, the flow through all the units being simultaneously regulated by rotating damper 75 to restrict flow in one of the outlet ducts to a desired amount.

The various forms of collectors heretofore described have employed one or more vertically arranged separating units with an outlet for cleaned gas at the same end as the inlet. However, the application of my invention is by no means restricted to separating units of this type and as typical of other forms of apparatus that may be used there is shown in Fig. 10 a horizontally extending separating unit in which the gas flows straight through the tube and leaves at the same end as the dust exit. This apparatus comprises horizontally extending cylindrical shell 80 communicating at one end with gas inlet 81 through which gas laden with foreign particles flows. Near the inlet end of tube 80 there is provided a plurality of spiral vanes 82 spaced around a central core 83, these vanes being so placed as to impart a whirling motion to the gas as it passes them. As the whirling stream of gas moves toward the opposite end of separator 80, the foreign particles are thrown outwardly by centrifugal force to the walls of the separator and the gas at the center of the tube is freed of such foreign material. The collected dust is carried into dust outlet 85 where, with a small portion of the gas stream, it is carried away to any desired place. The dust may be separated in any suitable manner from this small portion of gas, and the gas may be returned to the inlet 81.

The gas outlet means, placed at the end of the separator opposite to inlet 81, comprises an inner conical member 86 and an outer conical member 87, these two outlet members being concentric and arranged coaxially of the dust collector. As before described, outlet members 86 and 87 terminate in orifices that open into separator 80 at substantially the same plane. Outlet members 86 and 87 continue on and form suitable outlet ducts 86a and 87a; and at a suitable point in duct 87a there is placed damper 88 pivotally mounted on the walls of the duct. By means of this damper, gas flow out of the separator through outlet 87 is regulated as previously described to accommodate varying volumes of gas.

It is to be understood that various other arrangements and combinations of the several elements of the collectors hereinbefore described may be made without departing from the spirit and scope of my invention. For example, the separator units of Figs. 1 to 9 may be placed in a horizontal or inclined position, while the unit of Fig. 10 may be operated in a vertical or inclined position, and a number of separating units of the direct through-flow type shown in Fig. 10 may be used in parallel in the multiple-unit type of collectors herein described, preferably with similar arrangements for simultaneously restricting the flow of gas through one of the concentric gas outlet ducts of each unit. Furthermore, while I have shown the provision of only two concentric outlet passages, with means for restricting the flow of gas through one of these passages, it will be understood that any desired number of such concentric outlet passages may be provided in a single cyclone dust collector or in each of the separating elements of a multiple-element centrifugal dust collector, with means for restricting the flow of gas through one or more of these passages. Consequently, the foregoing description is to be construed as illustrative of rather than restrictive upon the appended claims.

I claim:

1. The combination with a plurality of dust separating units of the character described each having gas inlet means and dust outlet means, of gas outlet means adjacent the inlet end of the units comprising an inner and an outer outlet member for each separating unit having concentric orifices of different diameters opening into the separating unit; a pair of outlet ducts of which one communicates with all said outer outlet members and the other communicates with all said inner outlet members, each of said ducts delivering gas from the units at a point external of the units; and adjustable flow restricting means in the first mentioned of said outlet ducts adapted to control gas flow therethrough to regulate the relative proportion of gas leaving each separating unit through each of the associated inner and outer outlet members.

2. The combination with a plurality of dust separating units of the character described each having gas inlet means and dust outlet means, of gas outlet means comprising an inner and an outer outlet member for each separating unit having concentric orifices of different diameters opening into the separating unit; a pair of outlet ducts of which one communicates with all said outer outlet members and the other communicates with all said inner outlet members, each of said ducts delivering gas from the units at a point external of the units; and adjustable flow restricting means in the first mentioned of said outlet ducts at a point removed from said units adapted to reduce gas flow therethrough to increase the proportion of gas flowing through the inner outlet members of all the separating units.

3. The combination with a plurality of dust separating units of the character described each having gas inlet means and dust outlet means, of gas outlet means comprising a fixed inner and a fixed outer outlet member for each separating unit having concentric orifices of different diameters opening into the separating unit at substantially the same plane; a pair of outlet ducts of which one communicates with all said outer outlet members and the other communicates with all said inner outlet members, each of said ducts delivering gas from the units at a point external of the units; and adjustable flow restricting means in the first mentioned of said outlet ducts adapted to control gas flow therethrough to regulate the relative proportion of gas leaving each separating unit through each of the associated inner and outer outlet members.

4. The combination with a plurality of dust separating units of the character described each having gas inlet means and dust outlet means, of a common inlet header communicating with all the units; a pair of concentric gas outlet members in each unit arranged one inside the other and providing a pair of concentric gas outlet orifices opening into the unit; a first outlet header communicating with all of the outer ones of said concentric outlet members; a second outlet header beyond the first outlet header communicating with all the inner ones of said concentric outlet members, said inner outlet members extending through the first outlet header to the second outlet header; and flow restricting means in the first outlet header adapted to control gas flow therethrough to regulate the relative proportion of gas leaving each separating unit through each of the two concentric outlet members.

5. The method of separating finely divided foreign material from a stream of gas carrying the material in suspension, that comprises the steps of subdividing the initial stream into a plurality of separate smaller streams; imparting a high velocity whirling motion to each of the smaller streams in a closed chamber to separate the foreign material by centrifugal action; withdrawing the gas from each chamber in two separate concentric streams; combining all the inner concentric streams into a first stream of cleaned gas and combining all the outer concentric streams into a second stream of cleaned gas; and restricting the flow of the second stream of cleaned gas as the rate of gas flow in the initial stream decreases in order to increase the proportion of gas withdrawn from each chamber by the inner concentric stream.

6. The method of separating finely divided foreign material from a stream of gas carrying the material in suspension as set out in claim 5, in which the gas flow of the second stream of cleaned gas is restricted at a rate to maintain a substantially constant draft loss across each of the chambers.

7. The method of separating finely divided foreign material from a stream of gas carrying the material in suspension as set out in claim 5, in which the rate of gas flow of the second stream of cleaned gas is controlled independently of the rate of flow of the first stream of cleaned gas and in relation to the rate of flow of the initial stream in a manner to maintain the draft loss across all of the chambers in excess of a predetermined minimum value as the rate of flow through the chambers decreases.

ALFRED W. KNIGHT.